United States Patent
Lee et al.

(10) Patent No.: US 9,741,984 B2
(45) Date of Patent: Aug. 22, 2017

(54) BATTERY MODULE OF NOVEL STRUCTURE AND BATTERY PACK COMPRISING THE SAME

(71) Applicant: LG CHEM, LTD., Seoul (KR)

(72) Inventors: Bum Hyun Lee, Daejeon (KR); Jun Yeob Seong, Daejeon (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/759,859

(22) PCT Filed: Apr. 15, 2013

(86) PCT No.: PCT/KR2013/003129
§ 371 (c)(1),
(2) Date: Jul. 8, 2015

(87) PCT Pub. No.: WO2014/171559
PCT Pub. Date: Oct. 23, 2014

(65) Prior Publication Data
US 2016/0028056 A1    Jan. 28, 2016

(51) Int. Cl.
*H01M 2/10* (2006.01)
*H01M 2/20* (2006.01)
(Continued)

(52) U.S. Cl.
CPC ....... *H01M 2/1083* (2013.01); *B60L 11/1861* (2013.01); *B60L 11/1864* (2013.01);
(Continued)

(58) Field of Classification Search
CPC ............ H01M 2/1083; H01M 2/0275; H01M 2/0212; H01M 2/206; H01M 2/1077;
(Continued)

(56) References Cited

U.S. PATENT DOCUMENTS

| 6,569,561 B1 | 5/2003 | Kimura et al. |
| 2007/0207377 A1 | 9/2007 | Han et al. |

(Continued)

FOREIGN PATENT DOCUMENTS

| EP | 2 187 465 A1 | 5/2010 | |
| JP | H11-297371 | * 10/1999 | ............... H01R 4/02 |

(Continued)

OTHER PUBLICATIONS

International Search Report issued in PCT/KR2013/003129, mailed on Jan. 21, 2014.
(Continued)

*Primary Examiner* — Patrick Ryan
*Assistant Examiner* — Aaron Greso
(74) *Attorney, Agent, or Firm* — Birch, Stewart, Kolasch & Birch, LLP (57) ABSTRACT

Disclosed herein is a battery module including a unit module stack configured to have a structure in which two or more unit modules, each of which includes two or more battery cells mounted at a cell cover in a state in which the battery cells are electrically connected to each other, and electrode terminal connection parts of which protrude outward from the cell cover in a state in which the electrode terminal connection parts are vertically bent, are stacked, a module case in which the unit modules of the unit module stack are arranged such that the unit modules are connected in series to each other, and electrode terminals of the unit modules are open, a bus bar assembly mounted at the electrode terminals of the unit modules in the module case, the bus bar assembly including one or more bus bars for connection in series between the unit modules, the bus bars being mounted in an exposed state such that welding is performed from outside, and an electrically insulative cover for covering the bus bar assembly.

20 Claims, 7 Drawing Sheets

(51) Int. Cl.
  *B60L 11/18* (2006.01)
  *H01M 2/02* (2006.01)

(52) U.S. Cl.
  CPC ....... *B60L 11/1879* (2013.01); *H01M 2/1077* (2013.01); *H01M 2/206* (2013.01); *H01M 2/0212* (2013.01); *H01M 2/0275* (2013.01); *H01M 2220/20* (2013.01); *Y02T 10/7005* (2013.01); *Y02T 10/7044* (2013.01); *Y02T 10/7061* (2013.01)

(58) Field of Classification Search
  CPC ............ H01M 2220/20; B60L 11/1879; B60L 11/1861; B60L 11/1864; Y02T 10/7005; Y02T 10/7061; Y02T 10/7044
  See application file for complete search history.

(56) References Cited

U.S. PATENT DOCUMENTS

| | | | | |
|---|---|---|---|---|
| 2007/0238016 A1* | 10/2007 | Takamatsu | .......... | H01M 2/1077 429/120 |
| 2010/0009251 A1 | 1/2010 | Shin et al. | | |
| 2011/0070474 A1* | 3/2011 | Lee | ....................... | B60L 3/0046 429/120 |
| 2012/0156527 A1 | 6/2012 | Kataoka | | |
| 2012/0328908 A1* | 12/2012 | Han | .................... | H01M 2/1061 429/7 |
| 2013/0045409 A1* | 2/2013 | Schroeter | .............. | H01M 2/206 429/120 |
| 2013/0189563 A1 | 7/2013 | Chang et al. | | |
| 2014/0315057 A1 | 10/2014 | Lee et al. | | |

FOREIGN PATENT DOCUMENTS

| | | | | |
|---|---|---|---|---|
| JP | 2004-55348 A | | 2/2004 | |
| JP | 2004-327311 A | | 11/2004 | |
| JP | 2005-222701 A | | 8/2005 | |
| JP | 2005-222703 | * | 8/2005 | .............. H01M 2/30 |
| JP | 2010-519676 A | | 6/2010 | |
| JP | 2013-229266 A | | 11/2013 | |
| JP | 2014-22195 A | | 2/2014 | |
| KR | 2000-0001198 A | | 1/2000 | |
| KR | 10-2007-0025391 A | | 3/2007 | |
| KR | 10-2007-0112490 A | | 11/2007 | |
| KR | 10-2010-0109871 A | | 10/2010 | |
| KR | 10-1106103 B1 | | 1/2012 | |
| KR | 10-2012-0016353 A | | 2/2012 | |
| WO | WO 2011/027817 A1 | | 3/2011 | |
| WO | WO 2011/116804 | * | 9/2011 | .............. H01M 2/20 |
| WO | WO 2011/126216 A2 | | 10/2011 | |

OTHER PUBLICATIONS

Supplementary European Search Report in application No. 13882499.0 dated Mar. 7, 2016.

* cited by examiner

BATTERY MODULE OF NOVEL STRUCTURE AND BATTERY PACK COMPRISING THE SAME

TECHNICAL FIELD

The present invention relates to a battery module exhibiting high structural stability and a battery pack including the same, and more particularly to a battery module including a unit module stack configured to have a structure in which two or more unit modules, each of which includes two or more battery cells mounted at a cell cover in a state in which the battery cells are electrically connected to each other, and electrode terminal connection parts of which protrude outward from the cell cover in a state in which the electrode terminal connection parts are vertically bent, are stacked, a module case in which the unit modules of the unit module stack are arranged such that the unit modules are connected in series to each other, and electrode terminals of the unit modules are open, a bus bar assembly mounted at the electrode terminals of the unit modules in the module case, the bus bar assembly including one or more bus bars for connection in series between the unit modules, the bus bars being mounted in an exposed state such that welding is performed from outside, and an electrically insulative cover for covering the bus bar assembly.

BACKGROUND ART

In recent years, secondary batteries, which can be charged and discharged, have been widely used as an energy source for wireless mobile devices. In addition, the secondary batteries have attracted considerable attention as an energy source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle or large-sized devices, such as vehicles, use a middle or large-sized battery module including a plurality of battery cells electrically connected to each other because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the weight of the pouch-shaped battery is small, and the manufacturing cost of the pouch-shaped battery is low.

However, the mechanical strength of the sheathing member is low. For this reason, battery cells (unit cells) are mounted in a pack case, such as a cartridge, so as to manufacture a battery module having a stable structure. However, a device or a vehicle, in which a middle or large-sized battery module is installed, has a limited installation space. Consequently, in a case in which the size of the battery module is increased due to the use of the pack case, such as the cartridge, the spatial utilization is lowered. In addition, the battery cells repeatedly expand and contract during charge and discharge of the battery cells due to the low mechanical strength of the battery cells. As a result, thermally welded regions of the battery cells may be easily separated from each other.

In order to solve the above problem, therefore, Korean Patent Application No. 2006-45444, which has been filed in the name of the applicant of the present patent application, discloses a battery module including plate-shaped battery cells, each of which has electrode terminals formed at the upper end and the lower end thereof, wherein the battery module includes two or more battery cells, electrode terminals of which are connected in series to each other, connection parts between the electrode terminals being bent such that the battery cells are stacked, and a pair of high-strength cell covers coupled to each other for covering the entirety of the outer surface of the battery cell stack.

In the above disclosure, during assembly of the battery module, two pouch-shaped battery cells are arranged in series in a longitudinal direction such that the electrode terminals of the battery cells are continuously adjacent to each other, and then the electrode terminals of the battery cells are coupled to each other by ultrasonic welding. Subsequently, the two battery cells, the electrode terminals of which are coupled to each other, are folded such that the battery cells face each other to form a battery cell stack, the battery cell stack is mounted in the cell covers to manufacture a unit battery module, and electrode terminals between unit battery modules are connected to each other to manufacture a middle or large-sized battery module.

As previously described, however, during connection of the electrode terminals between the unit battery modules or connection of the electrode terminals and electrode tabs, the electrode terminals and the electrode tabs are welded to each other by ultrasonic welding before the battery module is mounted in a pack housing, and the battery module is mounted in the pack housing after the connection of the electrode terminals. Consequently, an assembly process is complicated and, in addition, impact generated during the assembly process may be transmitted to the electrode terminals with the result that an internal short circuit may occur.

In addition, the positive electrode terminal and the negative electrode terminal of the battery module are made of different materials. For this reason, welding coupling force is low when the positive electrode terminal and the negative electrode terminal are welded to each other. Furthermore, when external force, such as vibration and impact, is applied to the middle or large-sized battery module manufactured as described above, the welded regions of the battery module may be separated from each other with the result that a short circuit may occur.

Therefore, there is a high necessity for technology that is capable of easily assembling a middle or large-sized battery pack and improving welding reliability while solving the above problems, thereby fundamentally securing safety of the battery pack.

DISCLOSURE

Technical Problem

Therefore, the present invention has been made to solve the above problems and other technical problems that have yet to be resolved.

Specifically, it is an object of the present invention to provide a battery module configured to have a structure in which battery cells connected in parallel to each other are arranged in a specific structure and are connected in series to each other using a specific bus bar assembly so as to provide large capacity such that the battery module is compact, stable, and easy to assemble, and various battery cells may be used as needed during manufacture of the battery module, and a battery pack including the same.

Technical Solution

In accordance with one aspect of the present invention, the above and other objects can be accomplished by the provision of a battery module including a unit module stack configured to have a structure in which two or more unit modules, each of which includes two or more battery cells mounted at a cell cover in a state in which the battery cells are electrically connected to each other, and electrode terminal connection parts of which protrude outward from the cell cover in a state in which the electrode terminal connection parts are vertically bent, are stacked, a module case in which the unit modules of the unit module stack are arranged such that the unit modules are connected in series to each other, and electrode terminals of the unit modules are open, a bus bar assembly mounted at the electrode terminals of the unit modules in the module case, the bus bar assembly including one or more bus bars for connection in series between the unit modules, the bus bars being mounted in an exposed state such that welding is performed from outside, and an electrically insulative cover for covering the bus bar assembly.

Consequently, the battery module according to the present invention and a battery pack including the same may be configured such that the battery module and the battery pack are compact, stable, and easy to assemble based on the specific structure as described above. In addition, during manufacture of the battery module and the battery pack including the same, various battery cells may be used as needed.

In addition, the battery cells may be connected in parallel to each other. Since welding between the members made of the same material is achieved, welding reliability is improved.

Each of the battery cells may be a plate-shaped battery cell, which provides a high stacking rate in a limited space. For example, each of the battery cells may be configured to have a structure in which an electrode assembly is mounted in a battery case made of a laminate sheet.

Specifically, each of the battery cells may be a pouch-shaped secondary battery configured to have a structure in which an electrode assembly of a positive electrode/separator/negative electrode structure is received in a battery case together with an electrolyte in a sealed state. For example, each of the battery cells may be a plate-shaped secondary battery configured to have an approximately rectangular hexahedral structure having a small thickness to width ratio. In general, the pouch shaped secondary battery includes a pouch-shaped battery case. The battery case may be configured to have a laminate sheet structure in which an outer coating layer formed of a polymer resin exhibiting high durability, a harrier layer formed of a metal material that is capable of blocking moisture or air, and an inner sealant layer formed of a thermally bondable polymer resin are sequentially stacked.

In a preferred example, the battery cells of the unit modules may be connected in parallel to each other in a state in which the electrode terminals are directly coupled to each other, and the electrode terminal connection parts may be vertically bent such that the electrode terminal connection parts have welding surfaces, with which the bus bars of the bus bar assembly come into contact.

Each of the battery cells may be configured to have a structure in which a positive electrode terminal and a negative electrode terminal are formed at one end of each of the battery cells, and the unit modules may be stacked in a state in which the unit modules alternately arranged such that the positive electrode terminal and the negative electrode terminal are adjacent to each other between adjacent ones of the unit modules.

The above alternate arrangement is very preferable since it is not necessary to use a long connection member for series connection between the unit modules.

Various module cases may be provided. For example, the module case may be configured to have a frame structure that is capable of covering an outer circumferential surface of the unit module stack.

In the above structure, the module case may be provided at an outer surface thereof with one or more coupling parts for mounting the battery module to a device or a pack case.

The coupling parts may extend along the outer surface of the module case in a vertical direction in a state in which the coupling parts protrude from the outer surface of the module case, and each of the coupling parts may be provided with a depressed groove, which extends along a vertical central axis of each of the coupling parts. The shape and number of the grooves are not particularly restricted.

In a preferred example, the bus bar assembly may include an electrically insulative rectangular assembly body mounted at the module case, and one or more bus bars mounted at the rectangular assembly body in a state in which a front surface and a rear surface of each of the bus bars are open.

In a concrete example, the bus bar assembly may include a plurality of bus bars, and each of the bus bars may be a metal plate member having opposite ends coupled to the assembly body. Each of the bus bars may be provided at one end thereof with a detection terminal for voltage detection.

In the above structure, ones of the bus bars constituting external input and output terminals may include external input and output terminal parts, each of which has one end coupled to the assembly body in an extending state.

The external input and output terminal parts may be coupled to the assembly body, for example, by bolts. However, the present invention is not limited thereto.

According to circumstances, the bolts may also be coupled to the module case via the assembly body, for example, via through holes formed at the assembly body.

Meanwhile, electrical connection between the electrode terminal connection parts and the bus bars may be achieved by welding performed on outer surfaces of the bus bars.

The welding may be performed by applying laser to the outer surfaces of the bus bars.

The bus bar assembly may be mounted at the module case in various methods. For example, the bus bar assembly may be provided with fastening members, the fastening members protruding from opposite ends of the bus bar assembly, and the module ease may be provided with fastening grooves corresponding to the fastening members.

In the same manner, the cover may be mounted at the bus bar assembly in various methods. For example, the cover may be provided with fastening members, the fastening members protruding from opposite ends of the cover, and the bus bar assembly may be provided with fastening grooves corresponding to the fastening members.

In accordance with other aspects of the present invention, there are provided a battery pack including two or more battery modules mounted in a pack case, and a device including the battery module or the battery pack as a power source.

A preferred example of the device in which the battery pack according to the present invention may be used may include an electric vehicle, a hybrid electric vehicle, a plug-in hybrid electric vehicle, or a power storage device, which has a limited installation space, and is exposed to frequent vibration and strong impact.

Of course, the battery pack used as the power source of the vehicle may be combined and manufactured based on desired output and capacity.

The electric vehicle, the hybrid electric vehicle, and the plug-in hybrid electric vehicle using the battery pack as the power source are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
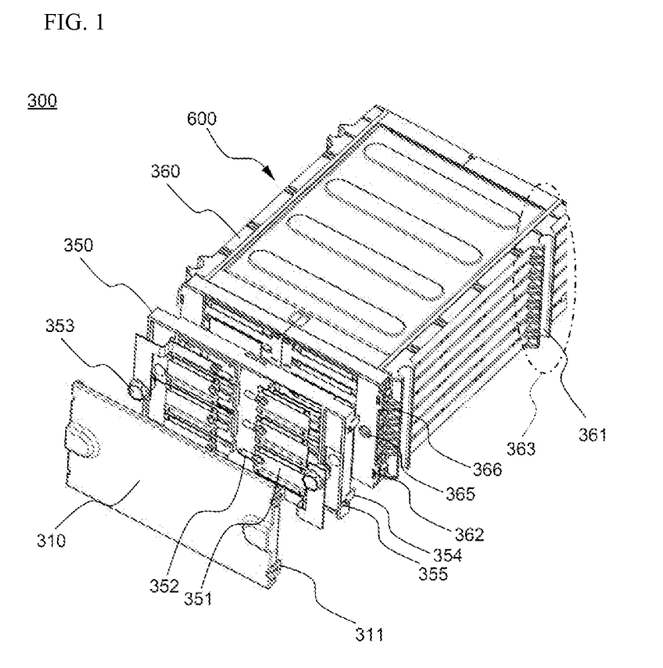
FIG. 1 is an exploded perspective view showing a battery module according to an embodiment of the present invention.
Figure 2:
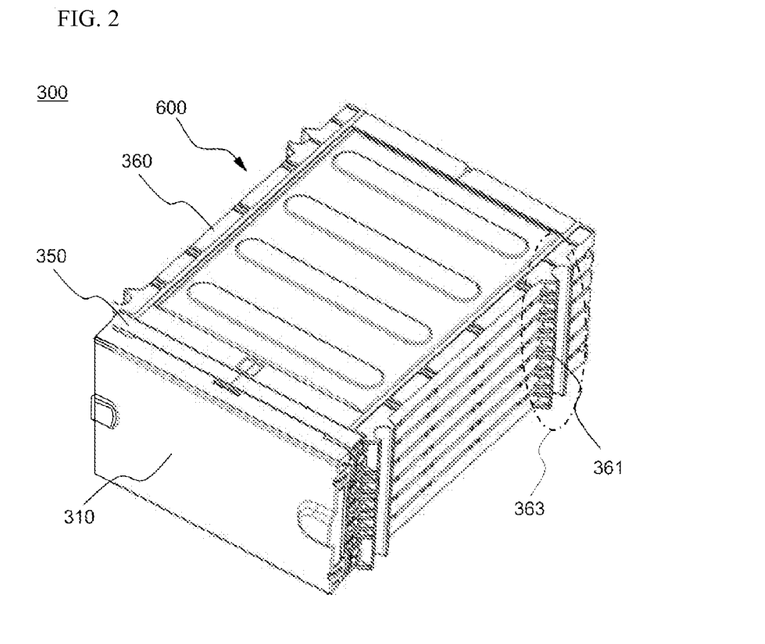
FIG. 2 is a perspective view showing the battery module according to the embodiment of the present invention.
Figure 3:
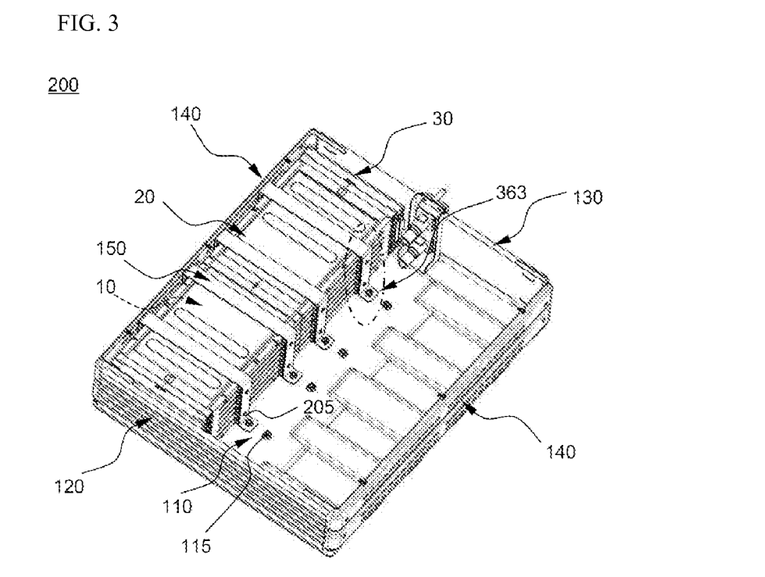
FIG. 3 is a perspective view showing a battery pack in which the battery modules according to the present invention are mounted.

FIG. 1 is an exploded perspective view typically showing a battery module according to an embodiment of the present invention, FIG. 2 is a perspective view typically showing the battery module according to the embodiment of the present invention, and FIG. 3 is a perspective view typically showing a battery pack in which the battery modules according to the present invention are mounted.

Referring to these figures, a battery pack 200 includes battery modules 300, a base plate 110, a front surface support member 120, a rear surface support member 130, side surface support members 140, and a plurality of strap members 150.

The battery modules 300 are loaded on the top surface of the base plate 110, and the front surface support member 120 and the rear surface support member 130 are mounted at the front surface and the rear surface of the battery modules 300, respectively.

The side surface support members 140 are coupled to the base plate 110 such that the side surface support members 140 covers side surfaces of the battery modules 300 constituting the outer surface of the battery pack 200 and partially covers the front surface and the rear surface of the battery pack 200.

The strap members 150 are coupled to the base plate 110 while covering the top surface and opposite side surfaces of the battery modules 300 for positioning and fixing the battery modules 300.

The base plate 110 is provided at positions thereof corresponding to the strap members 150 with through holes 115, through which fastening screws 205 for fixing the battery modules 300 are inserted.

Each of the battery modules 300 includes a unit module stack 600, a module case 360, a bus bar assembly 350, and an electrically insulative cover 310.

Each of the battery modules 300 is configured to have a structure in which unit modules 500 (refer to FIG. 6 below), each of which includes a plurality of battery cells 10, are stacked in a vertical direction. Each of the unit modules 500 is configured to have a structure in which outer surfaces of a plurality of battery cells 10 electrically connected to each other are covered by a cell cover 510 (refer to FIG. 6 below). Since the battery cells 10 are covered by the cell cover 510 such that the battery cells 10 are not exposed to the outside, the battery cells are indicated by dotted lines in the figures.

The structure of the battery cells 10 will hereinafter be described more detail.

More specifically, the unit module stack 600 constituting each of the battery modules 300 is configured to have a structure in which the unit modules 500, each of which includes two or more battery cells 10 mounted at the cell cover 510 in a state in which the battery cells 10 are connected in parallel to each other, electrode terminals (not shown) of the battery cells 10 protruding outward from the cell cover 510 in a state in which the electrode terminals are vertically bent, are sequentially stacked.

The module case 360 is configured to have a frame structure open at the top surface and the front surface thereof such that the unit module stack 600 can be easily mounted, and the unit modules 500 can be mounted in a state in which the electrode terminals (riot shown) of the unit modules 500 protrude.

In addition, the module case 360 is provided with bolt insertion parts 365 and fastening grooves 362, by which the bus bar assembly 350 is coupled to the module case 360. Furthermore, the module case 360 is provided at outer portions of each side thereof with two coupling parts 363, by which the module case 360 is mounted to the base plate 110.

Specifically, the coupling parts 363 extend along the outer surface of the module case 360 in a vertical direction in a state in which the coupling parts 363 protrude from the outer surface of the module case 360. Each of the coupling parts 363 is provided with a depressed groove 361, which extends along a vertical central axis of each of the coupling parts 363. The strap members 150 are mounted at the base plate in a state in which each of the strap members 150 is inserted into a corresponding one of the depressed grooves 361. At the side of each of the depressed grooves 361 is formed a plurality of ribs 366 for supporting a corresponding one of the coupling parts 363.

The bus bar assembly 350 includes bus bars 351 mounted at one surface of the module case 360 for connecting the electrode terminals of the unit modules 500 in series to each other.

Each of the bus bars 351 is provided at one end thereof with a detection terminal 352 for voltage detection, which extends in a longitudinal direction. Ones of the bus bars 351 constituting external input and output terminals include external input and output terminal parts 353, each of which has one end mounted at an assembly body of the bus bar assembly 350 while extending in a longitudinal direction.

In addition, the bus bar assembly 350 is provided with fastening grooves 355 for coupling with the electrically insulative cover 310 and fastening members 354 for coupling with the module case 360.

When the bus bar assembly 350 is mounted at the front surface of the module case 360, the bus bars 351 come in contact with the electrode terminals of the unit modules 500. Consequently, laser may be applied to the bus bars 351 from ahead of the bus bar assembly 350 with the result that the bus bars 351 may be easily welded.

The electrically insulative cover 310 covers the bus bars 351 of the bus bar assembly 350.

The cover 310 is made of a plastic material for insulation between inner components and the outside. The cover 310 is provided with a plurality of fastening members 311 for coupling with the bus bar assembly 350.

The fastening members 311 formed at the cover 310 are inserted into the fastening grooves formed at the bus bar assembly 350, and the fastening members 354 formed at the bus bar assembly 350 are inserted into the fastening grooves 362 formed at the module case 360. As a result, the module case 360, the bus bar assembly 350, and the cover 310 of the battery module 300 are easily fastened to one another.

In addition, the external input and output terminal parts 353 are inserted into the bolt insertion parts 365 of the module case 360. As a result, coupling among the components of the battery module 300 is completed.

Figure 4:
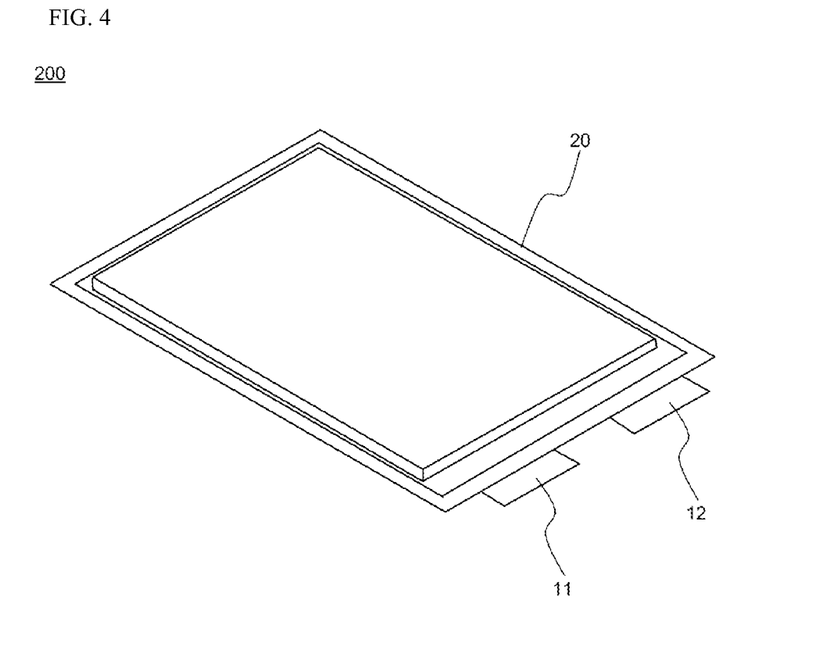
FIG. 4 is a perspective view showing a battery cell mounted in a unit module.
Figure 5:
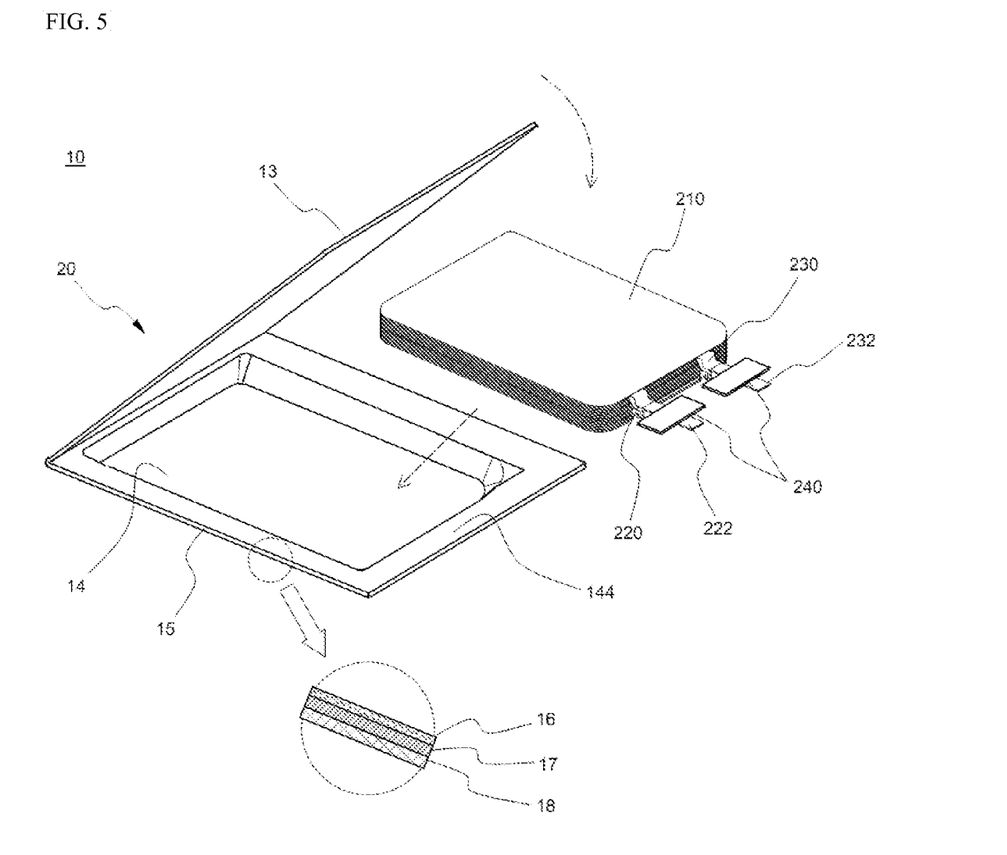
FIG. 5 is an exploded typical view showing the battery cell of FIG. 4.

FIG. 4 is a perspective view typically showing an exemplary battery cell mounted in a unit module of the present invention, and FIG. 5 is an exploded typical view showing the battery cell of FIG. 4.

Referring to these figures, a plate-shaped secondary battery 10 is configured to have a structure in which an electrode assembly, including positive electrodes, negative electrodes, and separators disposed respectively between the positive electrodes and the negative electrodes, is mounted in a pouch-shaped battery case 20 in a sealed state such that two electrode terminals 222 and 232 electrically connected to positive electrode and negative electrode tabs 220 and 230 of the electrode assembly are exposed outward.

The battery case 20 includes a case body 15 having a depressed receiving part 14, in which the electrode assembly 210 is located, and a cover 13 integrally connected to the case body 15.

The positive electrode tabs 220 and the negative electrode tabs 230 of the electrode assembly 210, which has a stacked type structure or a stacked/folded type structure, are respectively coupled to the electrode terminals 222 and 232 by welding. In addition, insulative films 240 are attached to the top and bottom of each of the electrode terminals 222 and 232 in order to prevent the occurrence of a short circuit between a thermal welding device and the electrode terminals 222 and 232 and to secure sealing between the electrode terminals 222 and 232 and the battery case 20 when a surplus part 144 of the case body 15 and the cover 13 are thermally welded to each other using the thermal welding device.

The case body 15 and the cover 13 each include an outer resin layer 16, an isolation metal layer 17, and an inner resin layer 18. The inner resin layer 18 of the case body 15 and the inner resin layer 18 of the cover 13 are fixed to each other in tight contact due to heat and pressure from the thermal welding device (not shown) pressing the outer surface of the case body 15 and the outer surface of the cover 13.

The surplus part 144 of the case body 15 and the cover 13 are thermally welded to each other in a state in which the electrode assembly 210, which is impregnated with an electrolyte, is located in the receiving part 14. As a result, a sealed portion is formed at the battery case 20.

Figure 6:
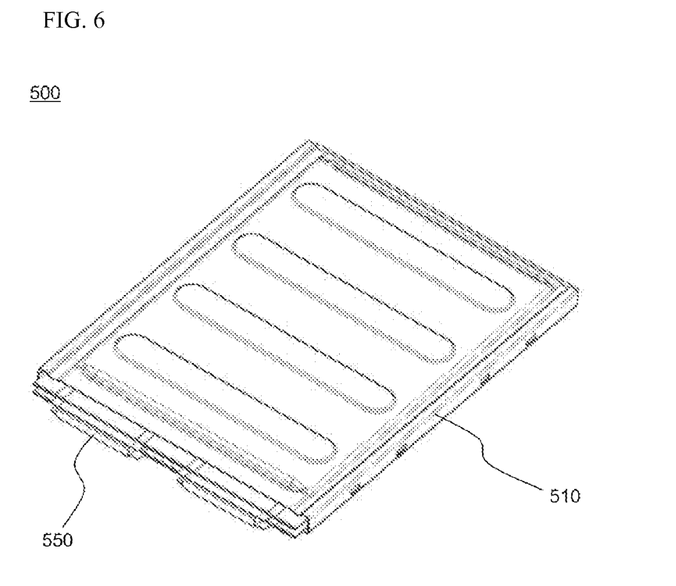
FIG. 6 is a perspective view showing a unit module in which two battery cells according to the present invention are mounted.
Figure 7:
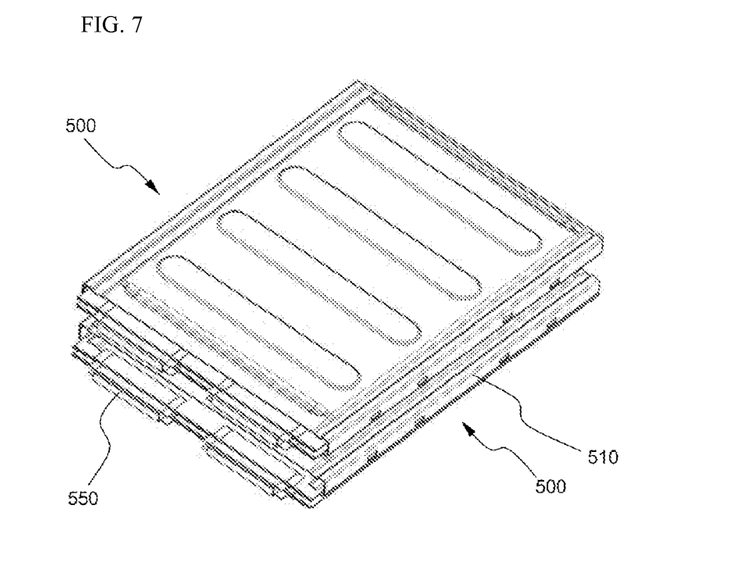
FIG. 7 is a perspective view showing a unit module stack in which two unit modules according to the present invention are stacked.
Figure 8:
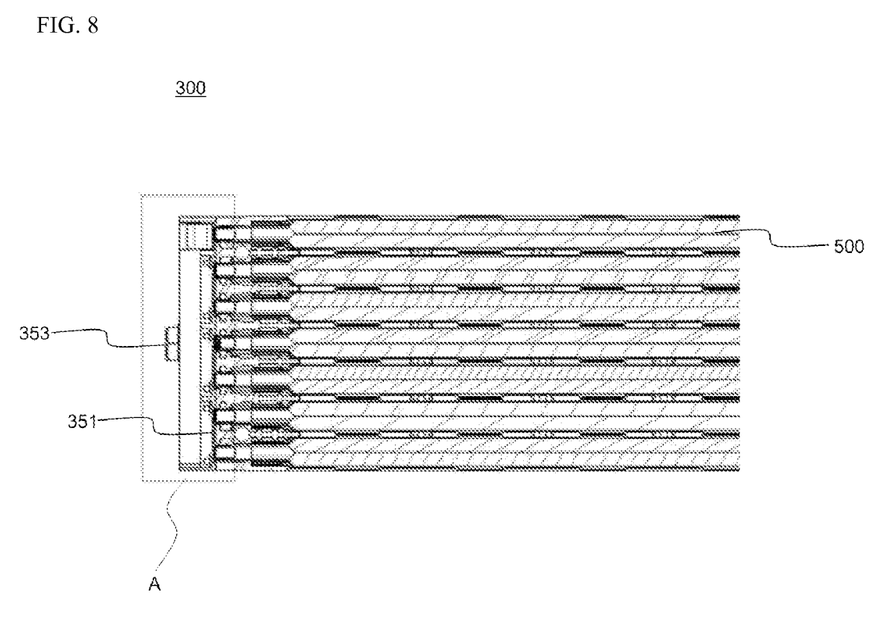
FIG. 8 is a plan view showing a battery module according to the present invention.
Figure 9:
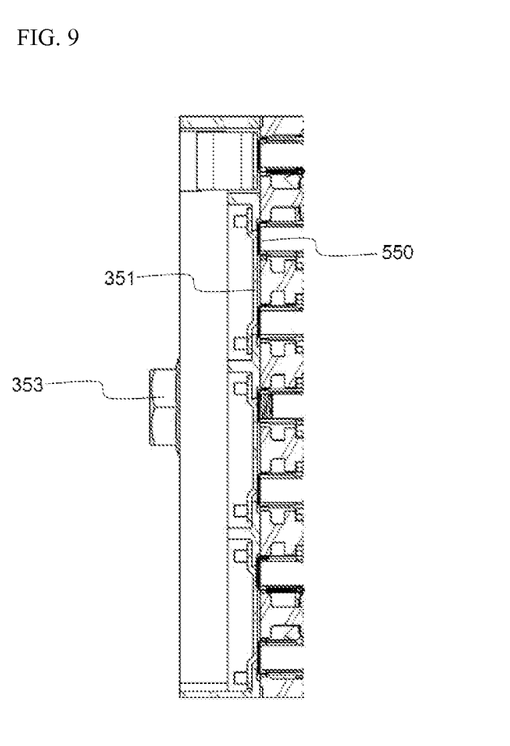
FIG. 9 is an enlarged view showing part 'A' of FIG. 8.

FIG. 6 is a perspective view typically showing a unit module in which two battery cells according to the present invention are mounted, FIG. 7 is a perspective view typically showing a unit module stack in which two unit modules according to the present invention are stacked, FIG. 8 is a plan view showing a battery module according to the present invention, and FIG. 9 is an enlarged view typically showing part 'A' of FIG. 7.

Referring to these figures, a unit module 500 includes two stacked battery cells 10 and a cell cover 510 for entirely covering the outside surfaces of the battery cells 10.

A battery module 300 includes a unit module stack 600 in which a plurality of unit modules 500 is stacked. Electrode terminals 222 and 232 of battery cells 10 mounted in each of the unit modules 500 are connected in series to each other while being exposed to the outside.

The electrode terminals 222 and 232 of the unit modules 500 are vertically bent such that the electrode terminals 222 and 232 of the unit modules 500 can be connected in parallel to each other. As a result, electrode terminal connection parts 550 formed in the shape of '[' in vertical section are formed at the unit modules 500. The electrode terminals having the same polarity are located on the same vertical line such that the electrode terminals having the same polarity can he connected in parallel to each other.

The electrode terminal connection parts 550 are vertically bent such that the electrode terminal connection parts 550 have welding surfaces, with which the bus bars 351 of the bus bar assembly 350 come into contact. The welding surfaces of the electrode terminal connection parts 550 and outer portions of the bus bars 351, which are disposed in contact the welding surfaces of the electrode terminal connection parts 550, are electrically connected to each other by laser welding. The laser welding is performed after the electrode terminal connection parts 550 are fixed to the module case 360, thereby easily achieving assembly of the battery module.

The unit modules 500 are connected to each other via the bus bars 351, and then electrically connected to the external input and output terminal parts 353.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module according to the present invention is configured to have a structure in which battery cells connected in parallel to each other are arranged in a specific structure and are connected in series to each other using a specific bus bar assembly. Consequently, the battery module is compact, stable, and easy to assemble. In addition, during manufacture of the battery module, various battery cells may be used as needed.

The invention claimed is:

1. A battery module comprising:
a unit module stack configured to have a structure in which two or more unit modules, each of which comprises two or more battery cells surrounded by a cell cover in a state in which the two or more battery cells are electrically connected to each other by vertically bending electrode terminals of the battery cells to form electrode terminal connection parts, the electrode terminal connection parts protrude outward from the cell cover in a state in which the electrode terminal connection parts extend vertically to define electrode terminals of the unit module, are stacked;
a module case in which the unit modules of the unit module stack are arranged such that the unit modules are connected in series to each other, and the electrode terminals of the unit modules are exposed through the module case;
a bus bar assembly mounted at the electrode terminals of the unit modules in the module case, the bus bar assembly comprising one or more bus bars for connection in series between the unit modules, the bus bars being mounted in an exposed state such that welding is performed from an outside of the module case; and
an electrically insulative cover for covering the bus bar assembly,
wherein the module case is provided at an outer surface thereof with one or more coupling parts for mounting the battery module to a device or a pack case, and
wherein the coupling parts extend along the outer surface of the module case in a vertical direction in a state in which the coupling parts protrude from the outer surface of the module case, a height of each of the coupling parts being equal to a height of the module case, and each of the coupling parts is provided with a depressed groove, which extends linearly along a vertical central axis of each of the coupling parts.

2. The battery module according to claim 1, wherein the battery cells are connected in parallel to each other.

3. The battery module according to claim 1, wherein each of the battery cells is a plate-shaped battery cell.

4. The battery module according to claim 3, wherein each of the battery cells is configured to have a structure in which an electrode assembly is mounted in a laminate battery case.

5. The battery module according to claim 1, wherein the battery cells of the unit modules are connected in parallel to each other in a state in which the electrode terminals of the battery cells are directly coupled to each other, and the electrode terminal connection parts extend vertically such that the electrode terminal connection parts have welding surfaces, with which the bus bars of the bus bar assembly come into contact.

6. The battery module according to claim 1, wherein each of the battery cells is configured to have a structure in which the electrode terminals include a positive electrode terminal and a negative electrode terminal are formed at one end of each of the battery cells, and the unit modules are stacked in a state in which the unit modules alternately arranged such that the positive electrode terminal and the negative electrode terminal are adjacent to each other between adjacent ones of the unit modules.

7. The battery module according to claim 1, wherein the module case is configured to have a frame structure for covering an outer circumferential surface of the unit module stack.

8. The battery module according to claim 1, wherein the bus bar assembly comprises:
an electrically insulative rectangular assembly body mounted at the module case; and
one or more bus bars mounted at the rectangular assembly body in a state in which a front surface and a rear surface of each of the bus bars are exposed via the electrically insulative rectangular assembly body.

9. The battery module according to claim 8, wherein the bus bar assembly comprises a plurality of bus bars, and each of the bus bars is a metal plate member having opposite ends coupled to the assembly body.

10. The battery module according to claim 9, wherein each of the bus bars is provided at one end thereof with a detection terminal for voltage detection.

11. The battery module according to claim 9, wherein ones of the bus bars constituting external input and output terminals comprise external input and output terminal parts, each of which has one end coupled to the assembly body in an extending state.

12. The battery module according to claim 11, wherein the external input and output terminal parts are coupled to the assembly body by bolts.

13. The battery module according to claim 12, wherein the bolts are also coupled to the module case.

14. The battery module according to claim 1, wherein electrical connection between the electrode terminal connection parts and the bus bars is achieved by welding performed on outer surfaces of the bus bars.

15. The battery module according to claim 14, wherein the welding is performed by applying laser to the outer surfaces of the bus bars.

16. The battery module according to claim 1, wherein the bus bar assembly is provided with fastening members, the fastening members protruding from opposite ends of the bus bar assembly, and the module case is provided with fastening grooves corresponding to the fastening members.

17. The battery module according to claim 1, wherein the cover is provided with fastening members, the fastening members protruding from opposite ends of the cover, and the bus bar assembly is provided with fastening grooves corresponding to the fastening members.

18. A battery pack comprising two or more battery modules according to claim 1 mounted in a pack case.

19. A device using a battery module according to claim 1 or a battery pack according to claim 18 as a power source.

20. The device according to claim 19, wherein the device is an electric vehicle, a hybrid electric vehicle, a plug-in hybrid electric vehicle, or a power storage device.

* * * * *